United States Patent
Guo et al.

(10) Patent No.: US 11,722,182 B2
(45) Date of Patent: Aug. 8, 2023

(54) DATA MULTIPLEXING TRANSMISSION METHOD, BASE STATION, TERMINAL, AND STORAGE MEDIUM

(71) Applicant: CHINA TELECOM CORPORATION LIMITED, Beijing (CN)

(72) Inventors: Jing Guo, Beijing (CN); Jianchi Zhu, Beijing (CN); Nanxi Li, Beijing (CN); Xiaoming She, Beijing (CN); Peng Chen, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 17/596,132

(22) PCT Filed: Jun. 9, 2020

(86) PCT No.: PCT/CN2020/095208
§ 371 (c)(1),
(2) Date: Dec. 3, 2021

(87) PCT Pub. No.: WO2020/248983
PCT Pub. Date: Dec. 17, 2020

(65) Prior Publication Data
US 2022/0231732 A1    Jul. 21, 2022

(30) Foreign Application Priority Data
Jun. 13, 2019   (CN) .......................... 201910510133.6

(51) Int. Cl.
*H04B 7/0404* (2017.01)
(52) U.S. Cl.
CPC ................................. *H04B 7/0404* (2013.01)

(58) Field of Classification Search
CPC .. H04B 7/0404; H04B 7/0602; H04B 7/0691; Y02D 30/70; H01Q 3/005
See application file for complete search history.

(56) References Cited

U.S. PATENT DOCUMENTS

2018/0220468 A1    8/2018  Lin et al.
2020/0169995 A1*   5/2020  Nam ..................... H04B 7/0628
(Continued)

FOREIGN PATENT DOCUMENTS

| CN | 106797239 A | 5/2017 |
| CN | 108632839 A | 10/2018 |

(Continued)

OTHER PUBLICATIONS

Sony, Discussion—'Enhancements on multi-beam operation', 3GPP TSG RAN WG1 #97, R1-1906851, Reno, NV, May 13-17, 2019.
(Continued)

*Primary Examiner* — Siu M Lee
(74) *Attorney, Agent, or Firm* — Kilpatrick Townsend & Stockton LLP

(57) ABSTRACT

Disclosed are a data multiplexing transmission method, a base station, a terminal, and a storage medium. The method comprises: a base station sends service resource occupation information corresponding to a first terminal by means of a control channel, so that a second terminal performs data transmission processing on the basis of the service resource occupation information when detecting the service resource occupation information sent on the control channel. The method, base station, terminal, and storage medium provided by the present application provide a resource multiplexing solution, solve the problem of service resource conflicts between different users, and improve the utilization efficiency of uplink transmission resources.

16 Claims, 5 Drawing Sheets

(56) References Cited

U.S. PATENT DOCUMENTS

| | | | | |
|---|---|---|---|---|
| 2020/0267712 A1* | 8/2020 | Cirik | .................... | H04B 7/0695 |
| 2020/0296667 A1* | 9/2020 | Park | ................. | H04W 52/0274 |
| 2021/0168714 A1* | 6/2021 | Guan | ................. | H04W 52/242 |
| 2021/0336333 A1* | 10/2021 | Yang | ................... | H04W 52/028 |
| 2022/0077943 A1* | 3/2022 | Fan | ..................... | H04B 7/0874 |
| 2022/0166482 A1* | 5/2022 | Yu | ....................... | H04B 7/0404 |

FOREIGN PATENT DOCUMENTS

| | | |
|---|---|---|
| CN | 109391993 A | 2/2019 |
| CN | 1314065 A | 9/2019 |
| EP | 3471318 A1 | 4/2019 |
| WO | 2017192889 | 11/2017 |
| WO | 2018031825 | 2/2018 |

OTHER PUBLICATIONS

Nokia, Nokia Shanghai Bell, Discussion and Decision—'On UE Power Saving Triggering Mechanisms', 3GPP TSG RAN WG1 Meeting #95, R1-18113621, Spokane, WA, Nov. 12-16, 2018.

\* cited by examiner

DATA MULTIPLEXING TRANSMISSION METHOD, BASE STATION, TERMINAL, AND STORAGE MEDIUM

CROSS-REFERENCE TO RELATED APPLICATIONS

This application is the U.S. National Phase of International Patent Application No.: PCT/CN2020/095208, filed Jun. 20, 2021, which claims priority from the application having CN application No. 201910510133.6, filed on Jun. 13, 2019, the disclosures of which are incorporated herein as a whole.

TECHNICAL FIELD

The present disclosure relates to the field of communications technologies, and in particular, to a method, a system and a storage medium for controlling a working state of a terminal antenna panel.

BACKGROUND

The 5G (fifth generation mobile communication technology) communication system needs to meet the requirements of ultra-large traffic density, ultra-high transmission rate, lower transmission delay, more reliable network performance and the like. The NR-MIMO technique is one of the most potential key techniques for 5G. Currently, the 3GPP R16 protocol release is researching the subject of NR-MIMO technology enhancement, in which terminal multi-antenna panel transmission is one of the technical enhancement schemes.

SUMMARY

According to a first aspect of the present disclosure, a method for controlling an operating state of a terminal antenna panel is provided, including: at least one of a base station and a terminal obtains a configured antenna panel control mode, and controls the operating states of at least two antenna panels of the terminal according to the antenna panel control mode; wherein the antenna panel control modes include: the base station controls the operating state of the antenna panel, the terminal autonomously controls the operating state of the antenna panel, and the base station and the terminal jointly control the operating state of the antenna panel; the working state comprises: an activated state or an off state.

In some embodiments, at least one of the base station and the terminal controls an operating state of the antenna panel by transmitting control signaling according to the antenna panel control mode.

In some embodiments, the antenna panel control mode is that a base station controls an operating state of an antenna panel, and the controlling the operating states of at least two antenna panels of the terminal according to the antenna panel control mode includes: the base station obtains at least one of first network quality information and first service demand resource information corresponding to the terminal; and the base station formulates a first working state control scheme based on at least one of the first network quality information and the first service demand resource information, and controls the operating states of at least two antenna panels of the terminal according to the first working state control scheme.

In some embodiments, said controlling the operating state of said antenna panel by sending control signaling comprises: the base station determines an antenna panel which needs to be activated by the terminal according to the first working state control scheme; the base station sends a first UE panel activation request signaling to the terminal so as to activate an antenna panel which needs to be activated by the terminal; and the base station receives a first UE panel activation completion signaling returned by the terminal, after the terminal completes the operation corresponding to the first UE panel activation request signaling.

In some embodiments, said controlling the operating state of said antenna panel by sending control signaling comprises: the base station determines an antenna panel required to be turned off by the terminal according to the first operating state control scheme; the base station sends a first UE panel deactivation request signaling to the terminal so as to turn off an antenna panel required to be turned off by the terminal; and the base station receives a first UE panel deactivation completion signaling returned by the terminal after the terminal completes the operation corresponding to the first UE panel deactivation request signaling.

In some embodiments, the antenna panel control mode is that a terminal autonomously controls an operating state of an antenna panel, and the controlling the operating states of at least two antenna panels of the terminal according to the antenna panel control mode includes: the terminal obtains second network quality information; and the terminal formulates a second operating state control scheme based on the second network quality information, and controls the operating states of at least two antenna panels of the terminal according to the second operating state control scheme.

In some embodiments, said controlling the operating state of said antenna panel by sending control signaling comprises: the terminal determines an antenna panel which needs to be activated by the terminal according to the second operating state control scheme; the terminal initiates a second UE panel activation request signaling; and after the terminal completes the operation corresponding to the second UE panel activation request signaling, sending a second UE panel activation completion signaling to the base station.

In some embodiments, said controlling the operating state of said antenna panel by sending control signaling comprises: the terminal determines an antenna panel which needs to be turned off by the terminal according to the second operating state control scheme; the terminal initiates a second UE panel deactivation request signaling; and after finishing the operation corresponding to the second UE panel deactivation request signaling, the terminal returns a second UE panel deactivation completion signaling to the base station.

In some embodiments, the antenna panel control mode is that a base station and a terminal jointly control the operating state of an antenna panel, and the controlling of the operating states of at least two antenna panels of the terminal according to the antenna panel control mode includes: the terminal obtains third network quality information and formulates a third operating state control scheme based on the third network quality information; the terminal determines the operating state of an antenna panel of the terminal based on the third operating state control scheme, and initiates an antenna panel control request to the base station based on the operating state; the base station obtains at least one of fourth network quality information and second service demand resource information corresponding to the terminal; the base station judges whether the antenna panel control request is matched with at least one of the fourth network quality information and the second service demand resource information; and the base station sends an antenna panel control instruction to the terminal based on the matching result for indicating the terminal to control the operating state of the antenna panel of the terminal.

In some embodiments, said controlling the operating state of said antenna panel by sending control signaling comprises: the terminal determines an antenna panel which needs to be activated by the terminal based on the third operating state control scheme; the terminal sends a third UE panel activation request signaling to the base station to request to activate the antenna panel which needs to be activated by the terminal; the base station sends a UE panel activation acceptance or rejection signaling to the terminal based on the matching result; and the base station receives a third UE panel activation completion signaling returned by the terminal after the terminal completes the operation corresponding to the UE panel activation acceptance or rejection signaling.

In some embodiments, said controlling the operating state of said antenna panel by sending control signaling comprises: the terminal determines an antenna panel which needs to be turned off by the terminal based on the third operating state control scheme; the terminal sends a third UE panel deactivation request signaling to the base station to request to turn off an antenna panel which needs to be activated by the terminal; the base station sends UE panel deactivation acceptance or rejection signaling to the terminal based on the matching result; and the base station receives a third UE panel deactivation completion signaling returned by the terminal after the terminal completes the operation corresponding to the UE panel deactivation acceptance or rejection signaling.

In some embodiments, the control signaling comprises: RRC signaling.

According to a second aspect of the present invention, there is provided a system for controlling the operating state of a terminal antenna panel, comprising: a base station and a terminal; at least one of the base station and the terminal is configured to: obtain a configured antenna panel control mode, and control the operating states of at least two antenna panels of the terminal according to the antenna panel control mode; wherein the antenna panel control modes include: the base station controls the operating state of the antenna panel, the terminal autonomously controls the operating state of the antenna panel, and the base station and the terminal jointly control the operating state of the antenna panel; the operating state comprises: an activated or off state.

In some embodiments, at least one of the base station and the terminal is further configured to control an operating state of the antenna panel by sending control signaling according to the antenna panel control mode.

In some embodiments, the antenna panel control mode controls an operating state of an antenna panel for a base station, wherein the base station is configured to: obtain at least one of first network quality information and first service demand resource information corresponding to the terminal; and formulate a first operating state control scheme based on at least one of the first network quality information and the first service demand resource information, and control the operating states of at least two antenna panels of the terminal according to the first operating state control scheme.

In some embodiments, the base station is configured to: determine an antenna panel which needs to be activated by the terminal according to the first operating state control scheme; send a first UE panel activation request signaling to the terminal to activate an antenna panel required to be activated by the terminal; and receive a first UE panel activation completion signaling returned by the terminal after the terminal completes the operation corresponding to the first UE panel activation request signaling.

In some embodiments, the base station is configured to: determine an antenna panel which needs to be turned off by the terminal according to the first operating state control scheme; send a first UE panel deactivation request signaling to the terminal, so as to turn off an antenna panel required to be turned off by the terminal; and receive a first UE panel deactivation completion signaling returned by the terminal after the terminal completes the operation corresponding to the first UE panel deactivation request signaling.

In some embodiments, the antenna panel control mode is that a terminal autonomously controls an operating state of an antenna panel, wherein the terminal is configured to: obtain second network quality information, formulate a second operating state control scheme based on the second network quality information, and control the operating states of at least two antenna panels of the terminal according to the second operating state control scheme.

In some embodiments, the terminal is configured to: determine an antenna panel which needs to be activated by the terminal according to the second operating state control scheme, and initiate a second UE panel activation request signaling; and send a second UE panel activation completion signaling to the base station after the operation corresponding to the second UE panel activation request signaling is completed.

In some embodiments, the terminal is configured to: determine an antenna panel which needs to be turned off by the terminal according to the second operating state control scheme; initiate a second UE panel deactivation request signaling; return a second UE panel deactivation completion signaling to the base station after completing an operation corresponding to the second UE panel deactivation request signaling.

In some embodiments, the antenna panel control mode is that a base station and a terminal jointly control an operating state of an antenna panel, wherein the terminal is configured to: obtain third network quality information, and formulate a third working state control scheme based on the third network quality information; determine the operating state of an antenna panel of the terminal based on the third operating state control scheme, and initiate an antenna panel control request to the base station based on the operating state; the base station is configured to: obtain at least one of fourth network quality information and second service demand resource information corresponding to the terminal; judge whether the antenna panel control request is matched with at least one of the fourth network quality information and the second service demand resource information; and send an antenna panel control instruction to the terminal based on the matching result for instructing the terminal to control the operating state of an antenna panel of the terminal.

In some embodiments, the terminal is configured to: the third operating state control scheme determines an antenna panel which needs to be activated by the terminal; send a third UE panel activation request signaling to the base station to request to activate the antenna panel which needs to be activated by the terminal; the base station is configured to: send a UE panel activation acceptance or rejection signaling to the terminal based on the matching result; wherein after completing the operation corresponding to the UE panel activation acceptance or rejection signaling, the terminal returns a third UE panel activation completion signaling to the base station.

In some embodiments, the terminal is configured to: determine an antenna panel which needs to be turned off by the terminal based on the third working state control scheme; sending a third UE panel deactivation request signaling to the base station to request to turn off an antenna panel which needs to be activated by the terminal; wherein the base station sends a UE panel deactivation acceptance or rejection signaling to the terminal based on the matching result; and the terminal is also used for returning a third UE panel deactivation completion signaling to the base station after completing the operation corresponding to the UE panel deactivation acceptance or rejection signaling.

According to a third aspect of the present disclosure, there is provided a method for controlling an operating state of a terminal antenna panel, performed by a base station, the method comprising: obtaining at least one of network quality information and service demand resource information based on the configured antenna panel control mode; and controlling the operating states of at least two antenna panels of the terminal according to the at least one piece of information.

In some embodiments, the controlling the operating states of at least two antenna panels of the terminal comprises: determining an antenna panel which needs to be activated or shut down by the terminal based on at least one of the network quality information and the service demand resource information; sending a UE panel activation request signaling or a UE panel deactivation request signaling to the terminal, so as to activate the antenna panel required to be activated by the terminal or turn off the antenna panel required to be turned off by the terminal; and receiving a UE panel activation completion signaling or a UE panel deactivation completion signaling returned by the terminal after the terminal completes the operation corresponding to the UE panel activation request signaling or the UE panel deactivation request signaling.

According to a fourth aspect of the present disclosure, there is provided a method for controlling an operating state of an antenna panel of a terminal, performed by the terminal, the method comprising: obtaining network quality information based on the configured antenna panel control mode; and controlling the operating states of at least two antenna panels of the terminal according to the network quality information.

In some embodiments, said controlling the operating states of at least two antenna panels of the terminal according to the network quality information comprises: determining an antenna panel which needs to be activated by the terminal or an antenna panel which needs to be switched off by the terminal based on the network quality information; initiating UE panel activation request signaling or UE panel deactivation request signaling; and after completing the operation corresponding to the UE panel activation request signaling or the UE panel deactivation request signaling, sending a UE panel activation completion signaling or a UE panel deactivation completion signaling to the base station.

In some embodiments, said controlling the operating states of at least two antenna panels of the terminal according to the network quality information comprises: determining an antenna panel which needs to be activated by the terminal or an antenna panel which needs to be switched off by the terminal based on the network quality information; sending an antenna panel control request to the base station by the terminal; the antenna control request includes: a UE panel activation request signaling or a UE panel deactivation request signaling; receiving a UE panel activation acceptance or rejection signaling or a UE panel deactivation acceptance or rejection signaling sent by the base station according to a matching result of judging whether the antenna panel control request is matched with at least one of the network quality information and the service demand resource information acquired by the base station; and after completing the operation corresponding to the UE panel activation acceptance or rejection signaling, returning a UE panel activation completion signaling to the base station, or after completing the operation corresponding to the UE panel deactivation acceptance or rejection signaling, returning a UE panel deactivation completion signaling to the base station.

According to a fifth aspect of the present disclosure, there is provided a base station comprising: a memory configured to store instructions; a processor coupled to the memory, the processor configured to perform an implementation of the method described above based on instructions stored by the memory.

According to a sixth aspect of the present disclosure, there is provided a terminal comprising: a memory configured to store instructions; a processor coupled to the memory, the processor configured to perform an implementation of the method described above based on instructions stored by the memory.

According to a seventh aspect of the present disclosure, there is provided a computer readable storage medium storing computer instructions for execution by a processor to perform the method as described above.

BRIEF DESCRIPTION OF THE DRAWINGS

In order to more clearly illustrate the embodiments of the present disclosure or technical solutions in related arts, the drawings used in the description of the embodiments or related arts will be briefly described below, it is obvious that the drawings in the description below are only some embodiments of the present disclosure, and for those skilled in the art, other drawings may be obtained according to the drawings without creative efforts.

DETAILED DESCRIPTION

Figure 1:
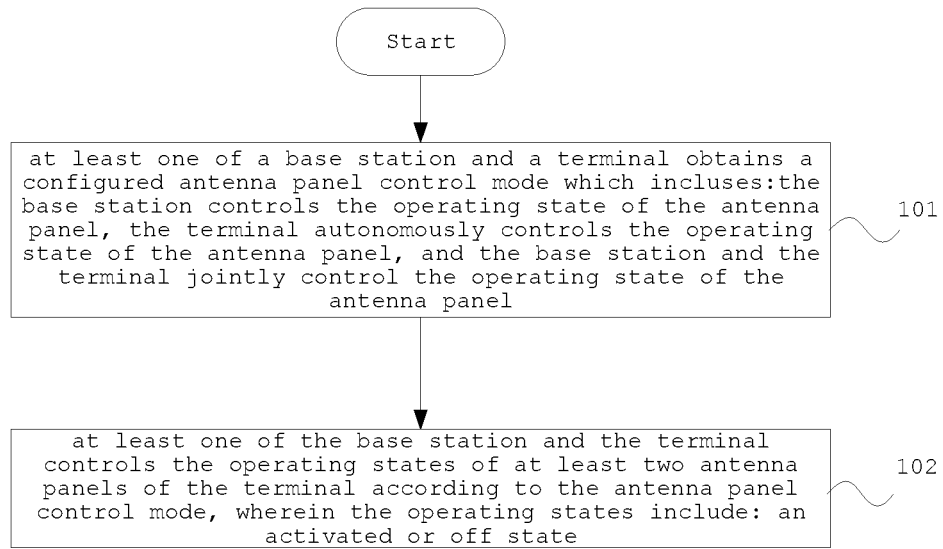
FIG. 1 is a flow diagram illustrating some embodiments of a method for controlling an operating state of a terminal antenna panel according to the present disclosure.

The present disclosure now will be described more fully hereinafter with reference to the accompanying drawings, in which exemplary embodiments of the disclosure are shown. The technical solutions in the embodiments of the present disclosure will be described clearly and completely with reference to the drawings in the embodiments of the present disclosure, and it is obvious that the embodiments described are only some, rather than all, of the embodiments of the present disclosure. All other embodiments, which can be derived by a person skilled in the art from the embodiments disclosed herein without making any creative effort, shall fall within the protection scope of the present disclosure. The technical solution of the present disclosure is variously described below with reference to various drawings and embodiments.

The terms "first", "second", etc. are used hereinafter only for descriptive distinction and have no other special meanings.

In the related art, as is known to the invention, in order to further improve the terminal reception capacity in a 5G communication system and meet the requirement of coverage in various scenarios of deployment, it is a necessary trend of technical evolution that the terminal implements multi-antenna panel transmission. For example, in a mobile phone, when there are two antenna panels, the antenna panels are placed back to back, and one antenna panel is connected to one serving base station in a butt joint manner, which is equivalent to dual link transmission, and thus the receiving performance of the terminal can be greatly improved. Particularly, in the moving process of the terminal, seamless connection with the base station can be realized, the call drop rate of the terminal is greatly reduced, but the power consumption of the terminal is greatly increased at the same time, and great challenges are presented to the problems of terminal energy saving, terminal radiation and the like.

In order to meet the requirement of communication quality and reduce the power consumption of the terminal, a mechanism for activating and shutting down the antenna panel of the terminal needs to be established, and in the case of good communication environment in the application scene with low traffic demand, part of the antenna panel can be shut down properly, so that the power consumption and radiation of the terminal are reduced while ensuring the system performance, so as to save energy for the terminal; and in the case of poor communication environment and limited coverage, some antenna panels can be properly activated to enhance the reception performance of the terminal to meet the requirement of communication quality.

In view of this, embodiments of the present disclosure provide a method, a system, and a storage medium for controlling an operating state of a terminal antenna panel, and provide three mechanisms for controlling activation and shutdown of the terminal antenna panel based on base station control, based on terminal autonomous selection, and based on joint control of the base station and the terminal, so that energy consumption of the terminal can be reduced to the greatest extent while ensuring the performance of the communication system, so as to better ensure the reliability of the communication system and flexibility of the configuration.

FIG. 1 is a schematic flowchart of some embodiments of a method for controlling an operating state of a terminal antenna panel according to the present disclosure, as shown in FIG. 1:

In step 101, at least one of a base station and a terminal obtains a configured antenna panel control mode.

The antenna panel control modes include: the base station controls the operating state of the antenna panel, the terminal autonomously controls the operating state of the antenna panel, and the base station and the terminal jointly control the operating state of the antenna panel.

In step 102, at least one of the base station and the terminal controls the operating states of at least two antenna panels of the terminal according to the antenna panel control mode, wherein the operating states include: an activated or off state, etc. The terminal is a mobile phone, a tablet computer and the like, and the base station can be various base stations. According to the antenna panel control mode, at least one of the base station and the terminal controls the operating state of the antenna panel by sending control signaling which can be RRC signaling and the like.

In some embodiments, the antenna panel control mode is a mode in which the base station controls the operating state of the antenna panel, and this control mode provides a mechanism for activating and turning off the terminal antenna panel based on the control of the base station, and the activation and turning off of the terminal antenna panel can be completely controlled by the base station, which can ensure the reliability and robustness of the communication system.

Figure 2:
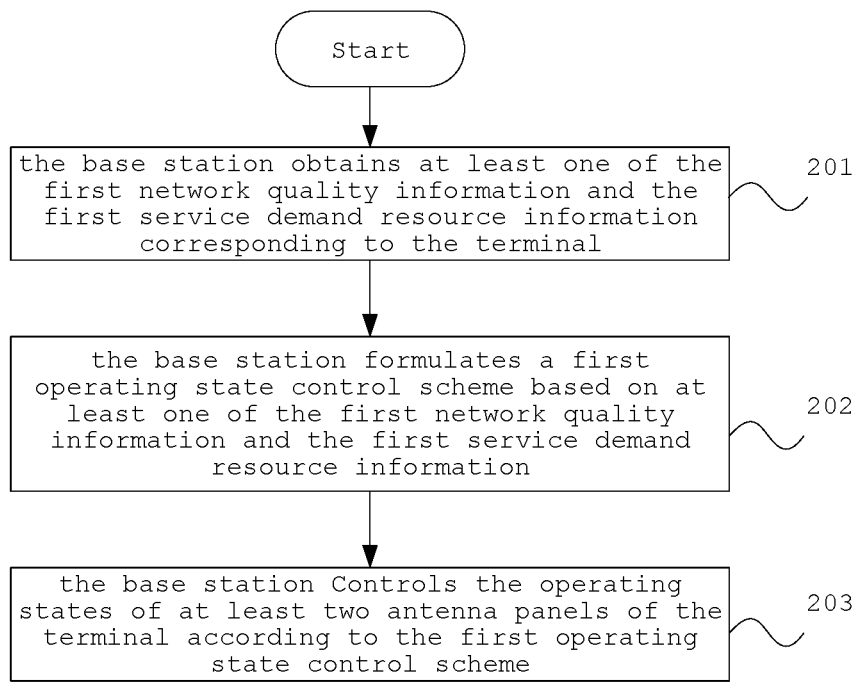
FIG. 2 is a flow diagram illustrating some embodiments of controlling an antenna panel according to a control pattern for controlling the antenna panel by a base station.

FIG. 2 is a flow chart illustrating some embodiments of controlling an antenna panel according to a control mode of controlling the antenna panel by the base station, as shown in FIG. 2:

In step 201, the base station obtains at least one of the first network quality information and the first service demand resource information corresponding to the terminal.

The network quality information can be obtained by various methods in the prior art, and the network quality information comprises information such as bandwidth, jitter, disconnection, signal quality and the like. The service demand resource information may be resource information such as a bandwidth corresponding to the provided service.

In step 202, the base station formulates a first operating state control scheme based on at least one of the first network quality information and the first service demand resource information.

In step 203, the operating states of at least two antenna panels of the terminal are controlled according to the first operating state control scheme.

For example, the terminal has three antenna panels, the content of the first operating state control scheme is a control scheme for activating or turning off the three antenna panels, and the base station controls the operating state of the three antenna panels of the terminal according to the first operating state control scheme.

The base station can flexibly configure a plurality of antenna panels of the terminal according to the actual condition of network scheduling, and can turn off part of the antenna panels of the terminal under the conditions of good network quality and the like or in the application scene where there are not large service demand resources, thereby reducing the power consumption of the terminal; and under the conditions of poor network quality, limited coverage and the like, the base station can activate part of the antenna panels, so that the receiving performance of the terminal is improved to meet the requirement of communication quality requirement.

In some embodiments, the antenna panel control mode is that the base station controls the operating state of the antenna panel, and the operating state of the antenna panel may be controlled through RRC signaling. For example, the base station determines an antenna panel which needs to be activated by the terminal according to the first operating state control scheme. The base station sends a first UE panel activation request signaling to the terminal so as to activate the antenna panel which needs to be activated by the terminal. And after the terminal completes the operation corresponding to the first UE panel activation request signaling, a first UE panel activation completion signaling is returned to the base station. The UE panel activation request signaling, the UE panel activation completion signaling, and the like are RRC signaling.

And the base station determines the antenna panel required to be turned off by the terminal according to the first working state control scheme. The base station sends a first UE panel deactivation request signaling to the terminal to turn off the antenna panel that the terminal needs to turn off. And after the terminal completes the operation corresponding to the first UE panel deactivation request signaling, returning a first UE panel deactivation completion signaling to the base station. The UE panel deactivation request signaling, UE panel deactivation completion signaling, etc. are RRC signaling.

Figure 3:
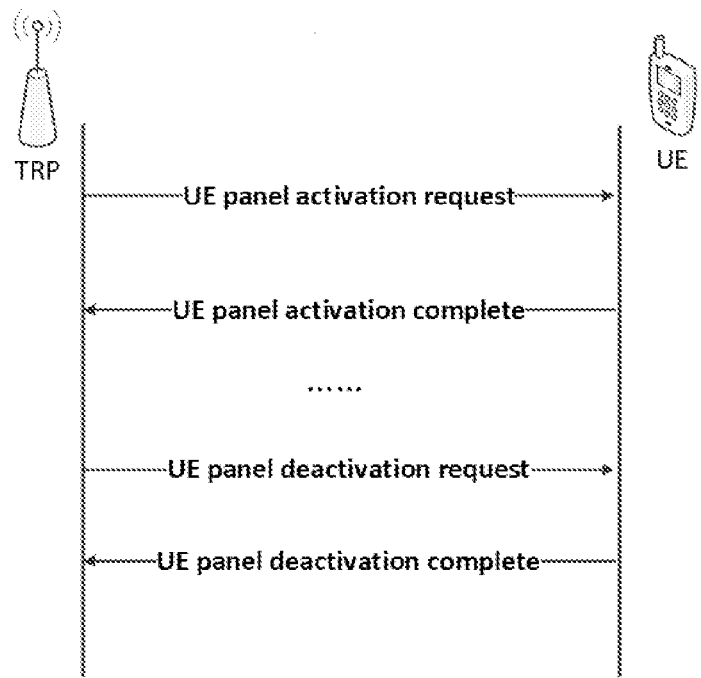
FIG. 3 is a schematic diagram of signaling interaction for some embodiments of controlling an antenna panel according to a control mode of a base station controlling the antenna panel.

As shown in FIG. 3, TRP (Transmission Reception Point) is equivalent to a conventional base station, and UE panel activation/deactivation request is sent by the base station, and the terminal feeds back UE panel activation/deactivation complete, so that the base station can perform absolute control on the configuration of the terminal antenna panel. The UE panel activation/deactivation request, the UE panel activation/deactivation complete, and the like are all RRC signaling.

In some embodiments, the antenna panel control mode is that the terminal autonomously controls the operating state of the antenna panel, and it is a terminal capability that the terminal implements the right of control over the antenna panel. The terminal can automatically perform the activation and the shutoff of the antenna panel of the terminal according to the actual condition of the network, which is highly flexible, without needing base station signaling configuration, and thus reduces the overhead of signaling.

Figure 4:
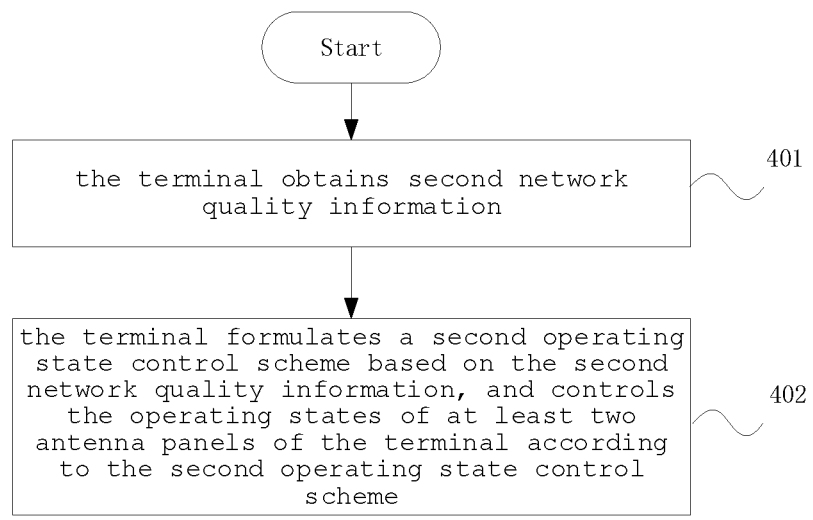
FIG. 4 is a flow diagram illustrating some embodiments of controlling an antenna panel according to a control mode in which a terminal autonomously controls the antenna panel.

FIG. 4 is a flowchart illustrating some embodiments of controlling an antenna panel according to a control mode in which a terminal autonomously controls the antenna panel. As shown in FIG. 4:

In step 401, the terminal obtains second network quality information.

In step 402, the terminal formulates a second operating state control scheme based on the second network quality information, and controls the operating states of at least two antenna panels of the terminal according to the second operating state control scheme.

The antenna panel control mode is that the terminal autonomously controls the operating state of the antenna panel. The operating state of the antenna panel can be controlled through RRC signaling. For example, the terminal determines, according to the second operating state control scheme, an antenna panel that the terminal needs to activate, and the terminal initiates a second UE panel activation request signaling, and the second UE panel activation request signaling initiated by the terminal may not be sent to the base station. After the terminal completes the operation corresponding to the second UE panel activation request signaling, a second UE panel activation completion signaling is sent to the base station.

The terminal determines an antenna panel which needs to be turned off according to the second working state control scheme; the terminal initiates a second UE panel deactivation request signaling, and returns a second UE panel deactivation completion signaling to the base station after the terminal completes the operation corresponding to the second UE panel deactivation request signaling.

Figure 5:
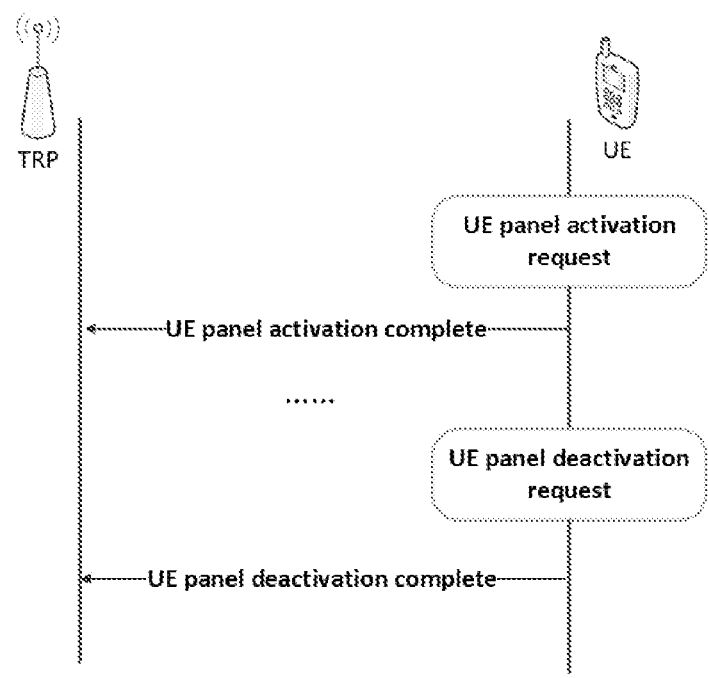
FIG. 5 is a schematic diagram of signaling interaction for some embodiments of controlling an antenna panel according to a control mode in which a terminal autonomously controls the antenna panel.

As shown in FIG. 5, the terminal initiates the UE panel activation/deactivation request, and feeds back "UE panel activation/deactivation complete" to the base station after completing the corresponding configuration, thereby implementing the independent option for the configuration of the antenna panel by the terminal. The UE panel activation/deactivation request, the UE panel activation/deactivation complete, and the like are all RRC signaling.

In some embodiments, the antenna panel control mode is to jointly control the operating state of the antenna panel by the base station and the terminal. The activation and the turning off of the antenna panel of the terminal are the results of the joint control of the base station and the terminal. The terminal provides an application for the activation and the turning off of the antenna of the terminal for the base station, and the base station makes a decision according to the network condition, thereby to complete the configuration of the antenna panel of the terminal, to better ensure the reliability of the system and the flexibility of the configuration.

Figure 6:
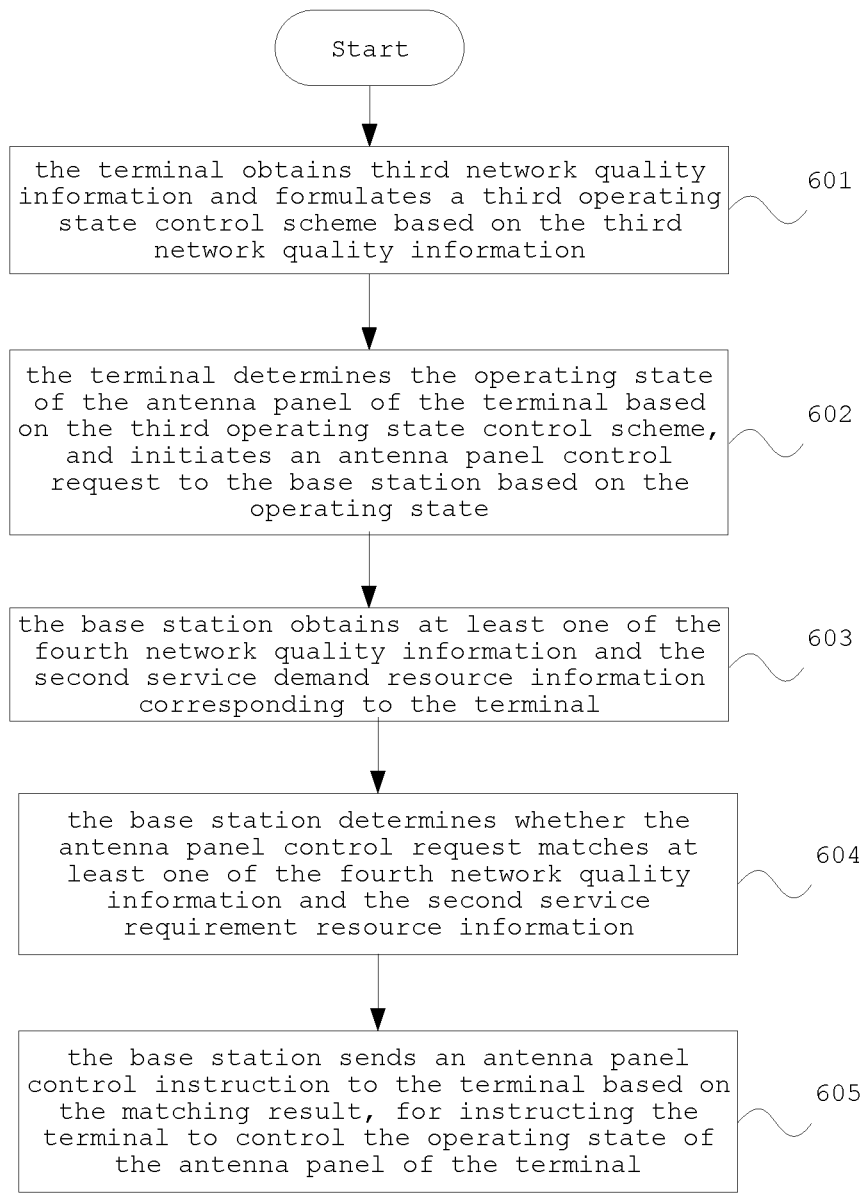
FIG. 6 is a flow diagram of some embodiments of controlling an antenna panel according to a control mode in which a base station and a terminal jointly control the antenna panel.

FIG. 6 is a flowchart illustrating some embodiments of controlling an antenna panel according to a control mode for jointly controlling the antenna panel by a base station and a terminal, as shown in FIG. 6:

In step 601, the terminal obtains third network quality information and formulates a third operating state control scheme based on the third network quality information.

In step 602, the terminal determines the operating state of the antenna panel of the terminal based on the third operating state control scheme, and initiates an antenna panel control request to the base station based on the operating state.

For example, the terminal may obtain network quality information including bandwidth, jitter, dropped connection, signal quality, etc. through various existing methods. The terminal has three antenna panels, and the content of the third operating state control scheme is activation of the antenna panel A, etc. The terminal determines that the operating state of the antenna panel A of the terminal is an activated state based on the third operating state control scheme, and initiates an antenna panel control request to the base station for requesting to configure the operating state of the antenna panel A to the activated state.

In step 603, the base station obtains at least one of the fourth network quality information and the second service demand resource information corresponding to the terminal.

In step 604, the base station determines whether the antenna panel control request matches at least one of the fourth network quality information and the second service requirement resource information.

Step 605, the base station sends an antenna panel control instruction to the terminal based on the matching result, for instructing the terminal to control the operating state of the antenna panel of the terminal.

For example, if the base station determines that the antenna panel A may be in the activated state based on at least one of the fourth network quality information and the second service requirement resource information, the matching result is successful, and the base station sends an antenna panel control instruction to the terminal to instruct the terminal to control the operating state of the antenna panel A to be an activated state. Or, the base station determines that the antenna panel A is in the off state based on at least one of the fourth network quality information and the second service demand resource information. If the matching result is a failure, the base station sends an antenna panel control instruction to the terminal for instructing the terminal to control the operating state of the antenna panel A to be in the off state.

The antenna panel control mode is that the base station and the terminal jointly control the operating state of the antenna panel, and the operating state of the antenna panel can be controlled through RRC signaling. For example, the terminal determines the antenna panel that needs to be activated by the terminal based on the third operating state control scheme, and the terminal sends a third UE panel activation request signaling to the base station to request activation of the antenna panel that needs to be activated by the terminal. The base station sends a UE panel activation acceptance or rejection signaling to the terminal based on the matching result. After the terminal completes the operation corresponding to the UE panel activation acceptance or rejection signaling, a third UE panel activation completion signaling is returned to the base station. The UE panel activation accept or reject signaling is RRC signaling.

Alternatively, the terminal determines the antenna panel which needs to be turned off based on the third operating state control scheme, and the terminal sends a third UE panel deactivation request signaling to the base station to request to turn off the antenna panel which needs to be activated by the terminal. The base station sends a UE panel deactivation acceptance or rejection signaling to the terminal based on the matching result; and after the terminal completes the operation corresponding to the UE panel deactivation acceptance or rejection signaling, a third UE panel deactivation completion signaling is returned to the base station. The UE panel deactivation accept or reject signaling is RRC signaling.

Figure 7:
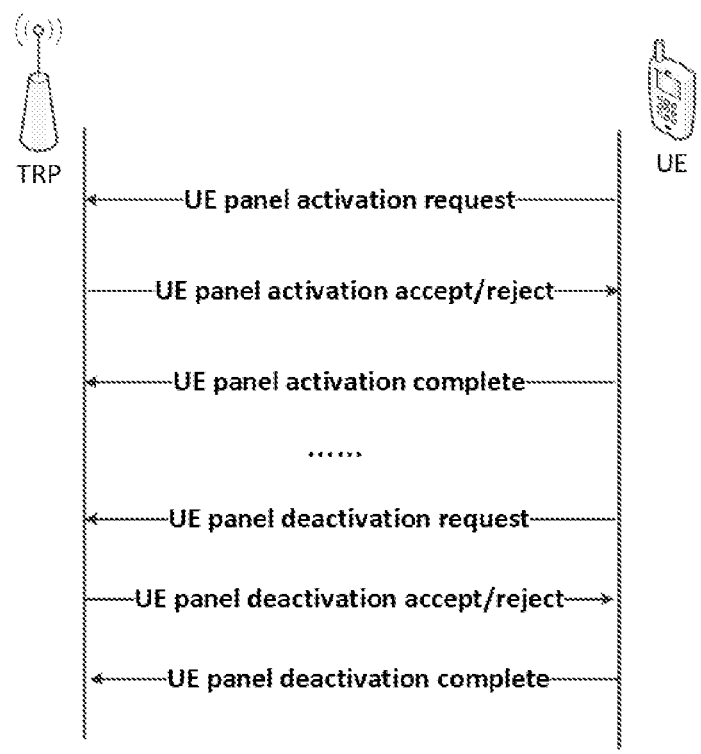
FIG. 7 is a schematic signaling interaction diagram of some embodiments of controlling an antenna panel according to a control mode in which a base station and terminal joint control the antenna panel.

As shown in FIG. 7, the terminal initiates a UE panel activation/deactivation request to the base station, the base station makes a reasonable decision according to the network condition and feeds back the UE panel activation/deactivation accept/reject to the terminal, the terminal executes corresponding configuration after receiving the decision and feeds back "UE panel activation/deactivation complete" to the base station, and the activation and deactivation mechanism of the antenna panel of the terminal is the result of the joint control of the base station and the terminal. The UE panel activation/deactivation request, the UE panel activation/deactivation accept/reject, etc. are all RRC signaling.

Based on the control method of the operating state of the terminal antenna panel in the above embodiment, the activation and the turning off of the terminal antenna panel can be completely controlled by the base station, completely selected by the terminal autonomously, or jointly controlled by the base station and the terminal; the initial configuration of the system can be realized through RRC signaling to meet the specific requirements of different scenes. The power consumption of the terminal can be reduced to the greatest extent while ensuring the system performance thereby to achieve energy saving for the terminal.

Figure 8:
FIG. 8 is a block schematic diagram of some embodiments of a control system of the operating state of a terminal antenna panel according to the present disclosure.

In some embodiments, as shown in FIG. 8, the present invention provides a system for controlling an operating state of a terminal antenna panel, including: a base station 81 and a terminal 82. At least one of the base station 81 and the terminal 82 obtains a configured antenna panel control pattern. The antenna panel control pattern comprises: the base station controls the operating state of the antenna panel, the terminal autonomously controls the operating state of the antenna panel, and the base station and the terminal jointly control the operating state of the antenna panel. At least one of the base station 81 and the terminal 82 controls the operating states of at least two antenna panels of the terminal according to the antenna panel control mode. The operating states including: an active or off state. At least one of the base station 81 and the terminal 82 controls the operating state of the antenna panel by transmitting control signaling according to the antenna panel control mode.

In some embodiments, the antenna panel control mode controls the operating state of the antenna panel for the base station, and the base station 81 obtains at least one of the first network quality information and the first traffic demand resource information corresponding to the terminal. The base station 81 formulates a first operating state control scheme based on at least one of the first network quality information and the first service demand resource information, and the base station 81 controls the operating states of at least two antenna panels of the terminal according to the first operating state control scheme.

The base station 81 determines the antenna panel that the terminal needs to activate according to the first operating state control scheme. The base station 81 sends a first UE panel activation request signaling to the terminal to activate the antenna panel that the terminal 82 needs to activate. After completing the operation corresponding to the first UE panel activation request signaling, the terminal 82 returns a first UE panel activation completion signaling to the base station 81. Alternatively, the base station 81 determines the antenna panel that the terminal needs to turn off according to the first operating state control scheme. The base station 81 sends a first UE panel deactivation request signaling to the terminal 82 to turn off the antenna panel that the terminal 82 needs to turn off. The terminal 82 returns a first UE panel deactivation completion signaling to the base station 81 after completing the operation corresponding to the first UE panel deactivation request signaling.

In some embodiments, the antenna panel control mode is that the terminal autonomously controls the operating state of the antenna panel, the terminal 82 obtains second network quality information, formulates a second operating state control scheme based on the second network quality information, and the terminal 82 controls the operating state of at least two antenna panels of the terminal according to the second operating state control scheme.

The terminal 82 determines the antenna panel that needs to be activated by the terminal according to the second working state control scheme, and initiates a second UE panel activation request signaling. The terminal 82 transmits a second UE panel activation completion signaling to the base station 81 after completing the operation corresponding to the second UE panel activation request signaling. Alternatively, the terminal 82 determines the antenna panel that the terminal needs to turn off according to the second operating state control scheme. The terminal 82 initiates the second UE panel deactivation request signaling, and after completing the operation corresponding to the second UE panel deactivation request signaling, the terminal 82 returns a second UE panel deactivation completion signaling to the base station 81.

In some embodiments, the antenna panel control mode is that the base station and the terminal jointly control the operating state of the antenna panel, and the terminal 82 obtains third network quality information and formulates a third operating state control scheme based on the third network quality information. The terminal 82 determines the operating state of the antenna panel of this terminal based on the third operating state control scheme and initiates an antenna panel control request to the base station based on this operating state.

The base station 81 obtains at least one of the fourth network quality information and the second service requirement resource information corresponding to the terminal to determine whether the antenna panel control request matches with the at least one of the fourth network quality information and the second service requirement resource information. The base station 81 sends an antenna panel control instruction to the terminal 82 based on the matching result, for instructing the terminal 82 to control the operating state of the antenna panel of this terminal 82.

The third operating state control scheme of the terminal 82 determines the antenna panel that this terminal 82 needs to activate. The terminal 82 sends a third UE panel activation request signaling to the base station 81 to request activation of the antenna panel that the terminal 82 needs to activate. The base station 81 sends a UE panel activation acceptance or rejection signaling to the terminal 82 based on the matching result. After completing the operation corresponding to the UE panel activation accept or reject signaling, the terminal 82 returns a third UE panel activation completion signaling to the base station 81.

The terminal 82 determines the antenna panel that needs to be turned off by the terminal 82 based on the third operating state control scheme, and sends a third UE panel deactivation request signaling to the base station 81 to request to turn off the antenna panel that needs to be activated by the terminal 82. The base station 81 sends a UE panel deactivation acceptance or rejection signaling to the terminal 82 based on the matching result, and the terminal 82 returns a third UE panel deactivation completion signaling to the base station 81 after completing an operation corresponding to the UE panel deactivation acceptance or rejection signaling.

According to yet another aspect of the present disclosure, a computer-readable storage medium is provided, which stores computer instructions for execution by a processor to perform the above method.

As will be appreciated by one of skill in the art, embodiments of the present disclosure may be provided as a method, system, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-usable non-transitory storage media (including, but not limited to, disk storage, CD-ROM, optical storage, and so forth) having computer-usable program code embodied therein.

The present disclosure is described with reference to flowchart illustrations and/or block diagrams of methods, apparatus (systems) and computer program products according to embodiments of the disclosure. It should be understood that each flow and/or block of the flowchart illustrations and/or block diagrams, and combinations of flows and/or blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in one or more processes in one flowchart and/or one or blocks in a block diagram.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps are configured to implement the functions specified in one or more processes in one flowchart and/or one or blocks in a block diagram.

The method, system and storage medium for controlling the operating state of the terminal antenna panel provided in the above embodiments provide three mechanisms for controlling the activation and turning off of the terminal antenna panel based on the control of the base station, the autonomous selection of the terminal, and the joint control of the base station and the terminal, and can reduce the power consumption at the terminal to the greatest extent while ensuring the performance of the communication system, which can ensure the reliability and robustness of the communication system and better sure the reliability of the communication system and the flexibility of configuration.

The description of the present disclosure has been presented for purposes of illustration and description, and is not intended to be exhaustive or limited to the disclosure in the form disclosed. Many modifications and variations will be apparent to those of ordinary skill in this art. The embodiment was chosen and described in order to best explain the principles of the disclosure and the practical application, and to enable others of ordinary skill in the art to understand the disclosure thereby to design various embodiments with various modifications as are suited to the particular use contemplated.

What is claimed is:

1. A method for controlling an operating state of a terminal antenna panel, comprising:
   at least one of a base station and a terminal obtains a configured antenna panel control mode, and controls the operating states of at least two antenna panels of the terminal according to the antenna panel control mode, wherein the antenna panel control modes includes: the base station controls the operating state of the antenna panel, the terminal autonomously controls the operating state of the antenna panel, and the base station and the terminal jointly control the operating state of the antenna panel; the operating state comprises: an activated or off state; and controlling, by at least one of the base station and the terminal, the operating state of the antenna panel by transmitting control signaling according to the antenna panel control mode, wherein the antenna panel control mode is that a base station and a terminal jointly control an operating state of an antenna panel, and the controlling the operating states of the at the least two antenna panels of the terminal according to the antenna panel control mode comprises:

the terminal obtains third network quality information and formulates a third working state control scheme based on the third network quality information;

the terminal determines the operating state of an antenna panel of the terminal based on the third operating state control scheme, and initiates an antenna panel control request to the base station based on the operating state;

the base station obtains at least one of fourth network quality information and second service demand resource information corresponding to the terminal;

the base station judges whether the antenna panel control request is matched with at least one of the fourth network quality information and the second service demand resource information; and the base station sends an antenna panel control instruction to the terminal based on the matching result, and the antenna panel control instruction is used for indicating the terminal to control the working state of the antenna panel of the terminal.

2. The method of claim 1, wherein the antenna panel control mode is that a base station controls an operating state of an antenna panel, wherein the controlling the operating states of the at least two antenna panels of the terminal according to the antenna panel control mode includes:

obtaining, by the base station, at least one of first network quality information and first service demand resource information corresponding to the terminal; and formulating a first working state control scheme by the base station based on at least one of the first network quality information and the first service demand resource information, and controlling, by the base station, the operating states of the at least two antenna panels of the terminal according to the first working state control scheme.

3. The method of claim 2, wherein the controlling the operating state of the antenna panel by sending control signaling comprising:

the base station determines an antenna panel which needs to be activated by the terminal according to the first working state control scheme;

the base station sends a first UE panel activation request signaling to the terminal so as to activate the antenna panel which needs to be activated by the terminal; and the base station receives a first UE panel activation completion signaling returned by the terminal, after the terminal completes the operation corresponding to the first UE panel activation request signaling.

4. The method of claim 2, wherein the controlling the operating state of the antenna panel by sending control signaling comprising:

the base station determines an antenna panel required to be turned off by the terminal according to the first operating state control scheme;

the base station sends a first UE panel deactivation request signaling to the terminal so as to turn off the antenna panel required to be turned off by the terminal; and the base station receives a first UE panel deactivation completion signaling returned by the terminal, after the terminal completes the operation corresponding to the first UE panel deactivation request signaling.

5. The method of claim 1, the antenna panel control mode being that a terminal autonomously controls an operating state of an antenna panel, wherein the controlling the operating states of the at least two antenna panels of the terminal according to the antenna panel control mode comprising:

the terminal obtains second network quality information; and the terminal formulates a second operating state control scheme based on the second network quality information, and controls the operating states of the at least two antenna panels of the terminal according to the second operating state control scheme.

6. The method of claim 5, wherein the controlling the operating state of the antenna panel by sending a control signaling comprises:

the terminal determines an antenna panel which needs to be activated according to the second operating state control scheme;

the terminal initiates a second UE panel activation request signaling; and after the terminal completes the operation corresponding to the second UE panel activation request signaling, a second UE panel activation completion signaling is sent to the base station.

7. The method of claim 5, wherein the controlling the operating state of the antenna panel by sending a control signaling comprising:

the terminal determines an antenna panel which needs to be turned off according to the second operating state control scheme;

the terminal initiates a second UE panel deactivation request signaling; and after completing the operation corresponding to the second UE panel deactivation request signaling, the terminal returns a second UE panel deactivation completion signaling to the base station.

8. The method of claim 1, wherein the controlling the operating state of the antenna panel by sending the control signaling comprises:

the terminal determines an antenna panel which needs to be activated by the terminal based on the third operating state control scheme;

the terminal sends a third UE panel activation request signaling to the base station to request to activate the antenna panel which needs to be activated by the terminal;

the base station sends a UE panel activation acceptance or rejection signaling to the terminal based on the matching result;

and the base station receives a third UE panel activation completion signaling returned by the terminal after the terminal completes the operation corresponding to the UE panel activation acceptance or rejection signaling.

9. The method of claim 1, wherein the controlling the operating state of the antenna panel by sending the control signaling comprises:

the terminal determines an antenna panel which needs to be turned off based on the third operating state control scheme;

the terminal sends a third UE panel deactivation request signaling to the base station to request to turn off an antenna panel which needs to be activated deactivated by the terminal;

the base station sends a UE panel deactivation acceptance or rejection signaling to the terminal based on the matching result; and the base station receives a third UE panel deactivation completion signaling returned by the terminal after the terminal completes the operation corresponding to the UE panel deactivation acceptance or rejection signaling.

10. A method of controlling an operating state of a terminal antenna panel executed by a base station, comprising:

obtaining at least one of network quality information and service demand resource information based on a configured antenna panel control mode; and controlling the operating states of at least two antenna panels of the terminal according to the at least one piece of information;

wherein the controlling the operating states of the at least two antenna panels of the terminal comprises:

determining an antenna panel which needs to be activated or turned off by the terminal based on at least one of the network quality information and the service demand resource information;

sending a UE panel activation request signaling or a UE panel deactivation request signaling to the terminal, so as to activate the antenna panel required to be activated by the terminal or turn off the antenna panel required to be turned off by the terminal; and receiving a UE panel activation completion signaling or a UE panel deactivation completion signaling returned by the terminal after completing the operation corresponding to the UE panel activation request signaling or the UE panel deactivation request signaling.

11. A base station, comprising:
a memory configured to store instructions; and
a processor coupled to the memory, the processor configured to implement the method of claim 10 based on instructions stored by the memory.

12. A non-transitory computer readable storage medium storing computer instructions for execution by a processor of the method of claim 10.

13. A method of controlling the operating state of a terminal antenna panel executed by a terminal, comprising:
obtaining network quality information based on a configured antenna panel control mode; and
controlling the operating states of at least two antenna panels of the terminal according to the network quality information;

wherein the controlling the operating states of the at least two antenna panels of the terminal according to the network quality information comprises:

determining an antenna panel which needs to be activated or turned off by the terminal based on the network quality information;

initiating UE panel activation request signaling or UE panel deactivation request signaling; and after completing the operation corresponding to the UE panel activation request signaling or the UE panel deactivation request signaling, sending a UE panel activation completion signaling or a UE panel deactivation completion signaling to a base station.

14. The method of claim 13, wherein the controlling the operating states of the at least two antenna panels of the terminal according to the network quality information comprises:

determining an antenna panel which needs to be activated or turned off by the terminal based on the network quality information;

sending an antenna panel control request to a base station by the terminal; the antenna control request includes: a UE panel activation request signaling or a UE panel deactivation request signaling;

receiving a UE panel activation acceptance or rejection signaling or a UE panel deactivation acceptance or rejection signaling sent by the base station according to a matching result of judging whether the antenna panel control request is matched with at least one of the network quality information and a service demand resource information acquired by the base station; and after completing the operation corresponding to the UE panel activation acceptance or rejection signaling, returning a UE panel activation completion signaling to the base station, or after completing the operation corresponding to the UE panel deactivation acceptance or rejection signaling, returning a UE panel deactivation completion signaling to the base station.

15. A terminal, comprising:
a memory configured to store instructions; and
a processor coupled to the memory, the processor configured to implement the method recited in claim 13 based on instructions stored by the memory.

16. A non-transitory computer-readable storage medium having thereon stored computer instructions which, when executed by a processor, implement the method according to claim 13.

* * * * *